Nov. 13, 1934.  C. F. FIELD ET AL  1,980,720
PACKING
Filed Feb. 21, 1930
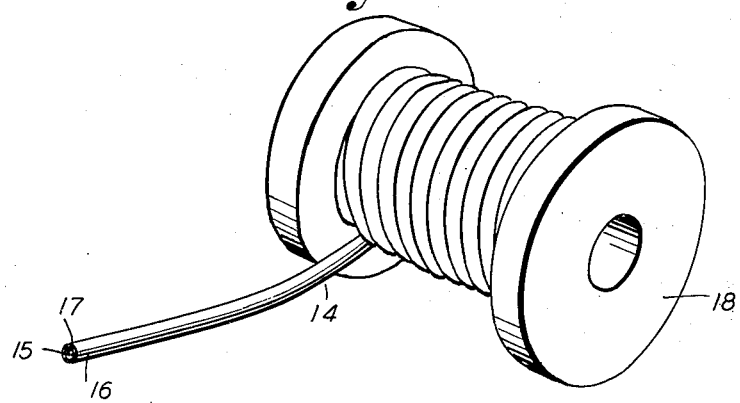
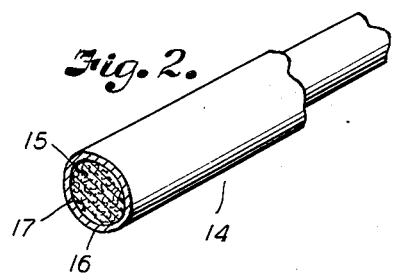
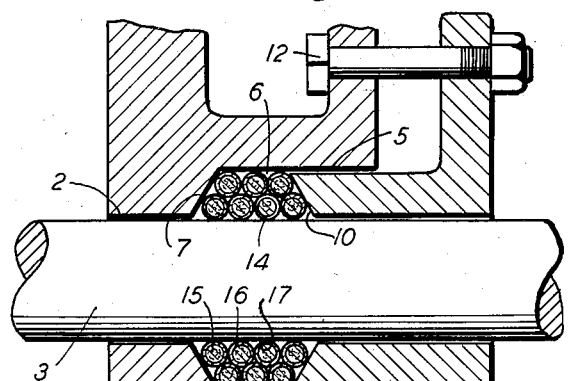
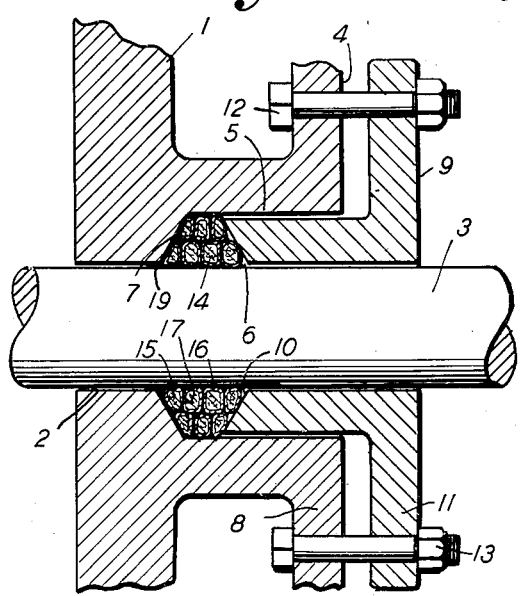
INVENTORS
Charles F. Field
and Zeno E. Flick
ATTORNEY Patented Nov. 13, 1934

1,980,720

UNITED STATES PATENT OFFICE 1,980,720

PACKING

Charles F. Field and Zeno E. Flick, Kansas City, Mo., assignors to Charles F. Field Manufacturing Company, Kansas City, Mo., a corporation of Missouri Application February 21, 1930, Serial No. 430,238

1 Claim. (Cl. 154—45.5)

Our invention relates to packing for sealing joints between movably or immovably connected members, and particularly to a device of that character adapted to be compressed to form a fluid-tight joint.

In one form our invention is adapted for application about a shaft stem, rod or like member movably mounted in a bearing or stuffing box opening to form a fluid-tight joint about the movable member.

In joints of this character the packing must be held closely against the movable rod, and when compressible packing of fabric, rubber or the like is employed, a jam nut acts on the packing to press and retain the same in sealing position. Compressible packing heretofore employed is relatively difficult and troublesome to apply, and tends to be dragged by the movement of the rod into the joint, particularly when the surface of the rod is roughened, whereby the mass of packing may be quickly reduced below the amount necessary to effect a seal, packing will be dispersed through the joint to cause interference with the smooth operation of the rod, and dispersed particles of the packing may pass to other parts of equipment to cause trouble.

A further disadvantage of packing heretofore used, especially fabric packing, is that it may tend to score or cut grooves in rods or rotating shafts, thus not only damaging the shaft, but reducing the desired sealing effect, and increasing friction between the shaft and its bearing.

When fabric or like packing is employed to seal a joint, lubrication must be provided for, to preserve the packing from rapid deterioration. Lubricant such as graphite originally incorporated in packing is dissipated to the rod and box, and lubricant otherwise supplied to the joint tends to be absorbed by the packing, thus rendering difficult the maintenance of the packing in suitable condition for long-continued efficient service, and reducing the effective life of the packing.

Metal bearings and gaskets applied to joints are not compressible after installation for readjustment to moving surfaces, but must be replaced when use and wear result in leakage, and in many situations such replacement is difficult and relatively expensive.

Our invention therefore has for its principal objects to increase the effective life of packing, to enhance the sealing efficiency of packing, to retain compressible packing in functioning position in a joint, to prevent dislodgment of portions of packing by a rod sealed in a joint by the packing, to preserve compressible packing from disintegration and dispersion under the movements of a rod in contact with the packing, to provide packing that will tend to enhance a seal when acted upon by roughened surfaces of a moving rod, to avoid scoring a movable member, to fill the scored grooves in shafts and form a smooth bearing surface, and to provide a compressible packing having metal surfaces for contact with moving surfaces in a joint.

A further object of our invention is to provide compressible packing including a metal cover adapted for the formation of a lateral integral flange, whereby a fabric or like core will be securely retained and insulated from joint surfaces, and the flange will be securely anchored to the core-covering portion and will promote the sealing effect of the packing.

In accomplishing these and other objects of our invention, we have provided improved details of structure, the preferred forms of which are illustrated in the accompanying drawing, wherein:

Fig. 1 is a perspective view of our improved packing wound on a spool for storage.

Fig. 2 is an enlarged perspective view of a fragment of the packing, a metal envelope being partly broken away to show the normal cylindrical form of the enclosed element.

Fig. 3 is a vertical section of a stuffing box and a portion of a shaft therein, showing our improved packing located in the box in position to be compressed.

Fig. 4 is a similar view illustrating the position of the packing when compressed, to seal the joint and effect formation of a lateral flange.

Fig. 5 is a section of a modified form of packing initially provided with a flange.

Referring in detail to the drawing:

1 designates a wall portion of apparatus having an opening 2 to receive a movable shaft or rod 3 rotatable or reciprocable in the opening, and which for purposes of illustrating one form of the invention are shown and will be referred to as the wall of a pump and a reciprocating shaft operating in the opening.

A stuffing box formed on the outer face of the wall 1 includes a wall 4 having an inner circular periphery 5 spaced from the shaft to form an annular recess or chamber 6, having a beveled inner end seat 7 inclined from the wall 4 toward the opening 2, and a radial flange 8 at the outer end of said wall. A gland or jam nut 9 comprising a sleeve slidable on the shaft has an inner end face 10 tapering from the periphery inwardly toward the axis of the sleeve, and a radial flange 11 adapted to be connected to the flange 8 by bolts 12 and nuts 13 whereby the sleeve may be urged inwardly of the stuffing box against packing 14 therein presently described to form a fluid tight joint between the wall 1 and the shaft.

The packing 14 includes a preferably cylindrical compressible core 15 formed preferably of fibrous material such as shreds of flax, fabric or asbestos, and comprising a wick-like body, a lubricant, preferably graphite, being incorporated in the core to enhance the flexibility thereof and contribute to the efficient service of the packing as presently described.

The core is surrounded by and enclosed in a formative cover 16 formed of relatively soft metal such as used in bearings, for example a metallic alloy adapted to resist action of water, lubricants, and chemicals, having a circumferentially integral inner wall or peripheral surface 17 closely engaged at all points with the surface of the core and forming substantially a solid, unbroken metal coating on the core. The cover is pliable and ductile, and has material thickness, to undergo distortion as later described, and may have a degree of hardness suitable for a particular service.

The cover is applied to the core by a suitable process adapted to produce a strand or string of packing comprising a continuous gasket strip of substantial length, and in which the outer and inner surfaces of the cover extend integrally continuously, thus comprising a gasket strip which may be stored on a reel 18 and from which gasket portions may be cut for use, the strips shown on the reel being illustrated as of initial cylindrical form for application to a shaft extending through a stuffing box, and adapted for the formation of a flange 19 as illustrated in Fig. 4 and presently described.

In the application of the invention to fixed joints, for example to joint surfaces having flat portions, the flange 19 is preferably initially provided as a longitudinal wing 20 comprising a distended and laterally extended portion of the tubular wall whereby the core is surrounded, as in the modified form of packing, illustrated in Fig. 5. Whereas the tubular wall of initially unflanged packing before use will have equal thickness at all points on a circumferential line, additional material is preferably provided to form the relatively wide and thick wing 20, and produce a relatively thick shoulder 21.

A suitable length of the packing adapted for coiling on a shaft may be severed from the strip for application to the stuffing box, and wound about the shaft, and moved along the shaft into the chamber 6.

The gland or jam nut may be operated to urge the packing inwardly of the chamber against the seat 7, the packing substantially retaining its cylindrical character while being moved into initial engagement with the seat and forming interstices at unengaged areas of the cover until seated, as indicated in Fig. 3.

Further operation of the gland will compress the packing, distorting the tubular metal wall and core to fill the spaces above referred to, the portions of packing adjacent the seat 7 and shaft being pressed securely thereagainst, to form an effectual seal.

The oppositely inclined characters of the end face of the sleeve and the seat 7 tend to insure pressure on the packing in the direction of the opening in the wall 1, and to press and distort packing around the shaft into the opening, as clearly shown in Fig. 4, whereas the portions of packing adjacent the opening in the sleeve are less distorted.

A portion of the metal cover is thus pressed into the opening of the wall 1, and forms a metal bearing surface over which the shaft may move with relative freedom. Direct contact of the shaft with the core is prevented by maintenance of the integral character of the tubular cover, which may be severely distorted without hazard of rupture, and neither cover nor core portions will be dragged by the shaft.

The metal cover tends further to compensate for any irregularities in the surface of the shaft, and to form a cushion or smooth surface over which roughened areas of the shaft may pass easily, thus affording means for overcoming the possible deficiency of a seal due to the roughened character of the shaft.

The character of the cover, especially when formed of a metallic alloy as suggested, is such that when a pump or like joint is packed, the packing forms its own metallic bearing and conforms to the high and low spots and scored pump shafts in such a way as to make a tight metallic bearing that will substantially prevent leakage.

Should use require readjustment of the packing, the gland may be operated to further compress the packing, and press the previously undistorted portions of the packing toward the seat, and thus progressively advance the portions toward and into the wall opening 1.

Successive applications of pressure through a gland or the like, and sliding movement of a rotating or reciprocating shaft over the inner periphery of the assembly of coils forming the packing, tend to consolidate and effect coalescence of the adjacent walls of the metal cover to form continuous inner metal bearing surfaces in contact with the shaft and outer surfaces engaging the containing walls. The coils thus become integrated into a single ring or annulus, comprising closely pressed coils completely enclosed in a metal cover, and adapted to be further compressed to maintain the bearing and seal should use or wear tend to bring about leakage.

While the invention has been illustrated and chiefly described for convenience as forming a water tight joint for a reciprocating rod, such as a pump shaft, and may obviously be applied for sealing a rotating shaft such as a power shaft or the stem of a valve, it may also be employed to seal fixed joints, and initially provided with the flange which is produced in the other forms after the packing has been applied. The relatively soft character of the cover material facilitates formation of holes in the flanges for bolts or the like to secure the jointed members together, and the bolts may puncture the flange when applied for producing the holes.

The metallic base or envelope of the packing is applied cold, and the packing is preferably made by a cold process, wherefore any desired alloy may be employed for cover material to provide desired hardness without hazard of change in the character of the alloy due to the steps of application. Because of the variation above referred to in thickness of the walls of the tubular cover for different purposes, and the manner in which the packing is distorted to seal a joint, the packing may be provided of any desired diameter, and adapted for the formation of a flange having a desired width either as a consequence of compression of the packing in use or as an original portion of the packing strip.

A strip adapted for use on a shaft may be initially provided with a flange to fit around the shaft in the shaft-receiving opening of a stuffing box and a portion of a strip sufficient to form a gasket or bearing may be given preliminary treatment to consolidate the coils and form an integrated ring for distribution as a finished gasket that may be split for application to a shaft.

The core forms a filler to hold the cover expanded and maintain the original contour of the sheath against accidental distortion until applied. The core further assures gradual constriction and distortion of the cover under pressure, and prevents buckling of the pipe-like cover.

What we claim and desire to secure by Letters Patent is:

A packing including an imperforate tube having an integral longitudinally extending wing, and a lubricant impregnated wick in the tube composed of shreds of fibrous material.

CHARLES F. FIELD.
ZENO E. FLICK.